United States Patent
Kawaji et al.

(10) Patent No.: US 7,673,022 B2
(45) Date of Patent: Mar. 2, 2010

(54) INFORMATION PROCESSING APPARATUS HAVING SMP LICENSE INFORMATION

(75) Inventors: Takuhiro Kawaji, Atsugi (JP); Yoshinori Wakai, Hadano (JP); Nakaba Osano, Isehara (JP)

(73) Assignee: Hitachi, Ltd., Tokyo (JP)

( * ) Notice: Subject to any disclaimer, the term of this patent is extended or adjusted under 35 U.S.C. 154(b) by 908 days.

(21) Appl. No.: 11/443,354

(22) Filed: May 31, 2006

(65) Prior Publication Data

US 2007/0011311 A1    Jan. 11, 2007

(30) Foreign Application Priority Data

Jun. 1, 2005    (JP)    ............................. 2005-160872

(51) Int. Cl.
- H01R 29/00    (2006.01)
- G06F 15/173    (2006.01)
- H05K 5/00    (2006.01)
- H04L 12/26    (2006.01)

(52) U.S. Cl. ...................... 709/220; 709/223; 709/224; 370/252; 439/188; 439/377; 361/752; 361/797; 361/802; 361/686; 361/796; 713/180

(58) Field of Classification Search ................. 709/220, 709/221, 223, 224; 713/100, 150, 300; 710/8, 710/10, 14, 304, 104

See application file for complete search history.

(56) References Cited

U.S. PATENT DOCUMENTS

| | | | |
|---|---|---|---|
| 6,292,790 B1 * | 9/2001 | Krahn et al. | 705/50 |
| 6,661,671 B1 * | 12/2003 | Franke et al. | 361/752 |
| 6,725,317 B1 | 4/2004 | Bouchier et al. | |
| 2002/0188709 A1 * | 12/2002 | McGraw et al. | 709/223 |
| 2003/0101304 A1 * | 5/2003 | King et al. | 710/301 |
| 2004/0257998 A1 * | 12/2004 | Chu et al. | 370/252 |
| 2004/0268157 A1 * | 12/2004 | Dake et al. | 713/300 |
| 2005/0026486 A1 * | 2/2005 | Thomas | 439/188 |
| 2005/0049976 A1 * | 3/2005 | Yang | 705/67 |
| 2005/0060388 A1 * | 3/2005 | Tatsumi et al. | 709/220 |
| 2005/0144434 A1 * | 6/2005 | Taylor et al. | 713/2 |
| 2006/0031448 A1 * | 2/2006 | Chu et al. | 709/223 |

* cited by examiner

*Primary Examiner*—Joseph E Avellino
*Assistant Examiner*—Tam Phan
(74) *Attorney, Agent, or Firm*—Brundidge & Stanger, P.C.

(57) ABSTRACT

In an information processing apparatus having a function for exploiting higher performance than a single server module by constituting an SMP by combining a plurality of server modules, a user is inhibited from illegally constituting an SMP construction that exceeds license information. When a partition is constituted by a construction against the SMP license information, a slot number representing the number of server modules belonging to a partition and mounted to a chassis and the number of server modules in the same partition are checked and the SMP construction is inhibited when they do not fall within the range of the slot number and the number of server modules in the license information.

15 Claims, 6 Drawing Sheets

| # | Model | | | Slot Number | | | |
|---|---|---|---|---|---|---|---|
| | 2way | 4way | 8way | Slot0 | Slot1 | Slot2 | Slot3 |
| 1 | X | X | X | 2 | | | |
| 2 | X | X | X | | 2 | | |
| 3 | X | X | X | | | 2 | |
| 4 | X | X | X | | | | 2 |
| 5 | | X | X | 2 | 2 | | |
| 6 | | X | X | | | 2 | 2 |
| 7 | | | X | 2 | 2 | 2 | |
| 8 | | | X | 2 | 2 | 2 | 2 |

US 7,673,022 B2

INFORMATION PROCESSING APPARATUS HAVING SMP LICENSE INFORMATION

INCORPORATION BY REFERENCE

The present application claims priority from Japanese application JP 2005-160872 filed on Jun. 1, 2005, the content of which is hereby incorporated by reference into this application.

BACKGROUND OF THE INVENTION

This invention relates to a blade server type information processing apparatus and more particularly to an information processing apparatus having SMP (Symmetric Multi Processor) license information.

U.S. Pat. No. 6,725,317 as a prior art reference discloses a multi-partition computer system which includes a plurality of cell boards each having a processor and in which a service processor connected to the cell boards manages the construction of partitions constituted by the cell boards. A system that prepares in advance spare resources and uses them whenever necessary on the basis of the concept of "Capacity On Demand" is also available. This system mounts beforehand extra-processors in view of future expansion of functions and performances so that the system can be as such utilized without stopping its operation by merely inputting a command when the expansion of the system becomes necessary. Another system manages not only the processors but also cells inclusive of memories and is able to quickly operate spare cells when the resources become insufficient.

SUMMARY OF THE INVENTION

In a blade server according to the prior art, a plurality of blade modules (server modules) having mounted thereto a CPU and a memory is mounted and each of these blade modules merely operates as a single server. In contrast, a server capable of exploiting higher single module performance than one set of the blade module by combining a plurality of blade modules to constitute an SMP in accordance with a business condition has been desired. In such a server, a contract/accounting system corresponding to the improvement of the performance by the SMP construction of the blade modules becomes a problem.

The prior art technologies include the system that physically handles the partition as a plurality of partitions and the management system that lets the modules purchased in advance operate whenever necessary, as explained above. However, a management system that limits the construction of the partition for executing accounting in accordance with the size of the partition has not been available.

In the server having the function of exploiting the higher performance than the performance of the single module by constituting the SMP through the combination of a plurality of server modules, a management system of license information for limiting a maximum server module number constituting the SMP construction becomes necessary.

In an information processing apparatus including a plurality of server modules and management modules for controlling the operation of each server module as a single server or the operation of server modules as a server of an SMP construction comprising two or more server modules, the management module has a storage device for storing construction information and judges the approval/rejection of the operation as the server of the SMP construction on the basis of the partition information stored in the storage device and the license information about the SMP construction.

According to the invention, a user cannot utilize as an SMP server a partition having a scale to which a license is not given. Therefore, accounting is imposed on the right for utilizing the partition having a predetermined size.

Other objects, features and advantages of the invention will become apparent from the following description of the embodiments of the invention taken in conjunction with the accompanying drawings.

DETAILED DESCRIPTION OF THE EMBODIMENTS

First of all, the outline of the present invention will be explained.

Figure 1:
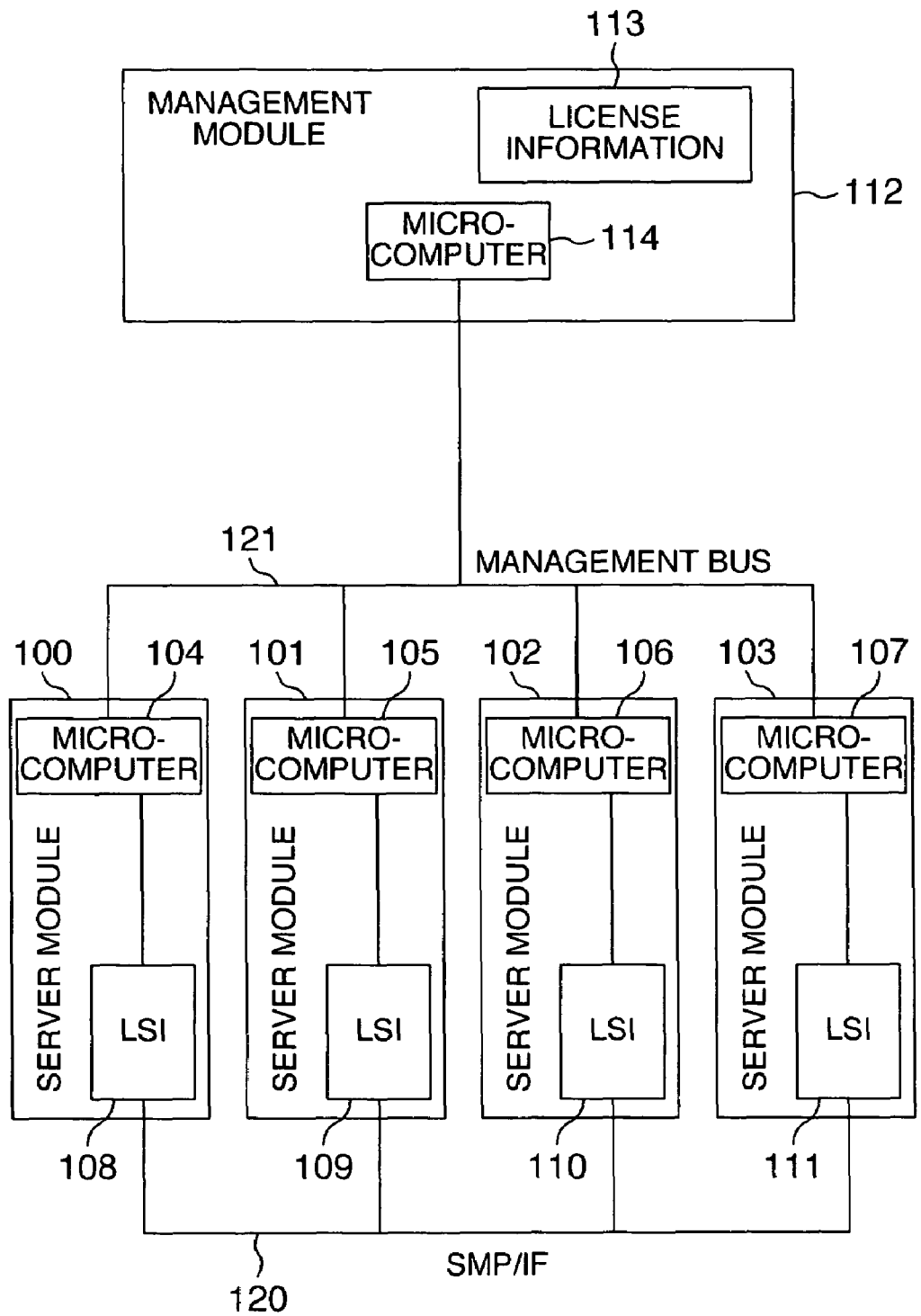
FIG. 1 is a schematic view of an SMP construction according to the invention.

FIG. 1 shows a schematic structural view of an SMP construction according to the invention. Each server module 100 to 103 having a processor and a memory includes a microcomputer 104 to 107 and an LSI 108 to 111. When the SMP construction is attained, a plurality of LSIs 108 to 111 operates the processors and the memories of the server modules 100 to 103 through SMP/IF 120 in the interlocking arrangement with one another. A management module 112 keeps license information 113 for deciding a maximum way number capable of constituting the SMP construction inside a storage device. Each server module 100 to 103 has its peculiar microcomputer. The management module 112 has its peculiar microcomputer 114, too. Since the microcomputers 104 to 107 and the microcomputer 114 are able to share the information between the management module 112 and each server module 100 to 103 through a management bus 121, the management module 112 controls the SMP construction.

To inhibit a user from illegally constituting an SMP construction that exceeds the license information 113, the management module 112 inhibits making of the power source to the server modules when an attempt is made to turn on the power source with a construction against the license information. When partitions are constituted, the management module 112 checks the slot number of the server module belonging to the partition and mounted to the casing and the number of server modules inside the same partition and inhibits the constitution of the SMP construction if these numbers are not within the slot number and the number of server modules in the license information.

The license might be illegally copied if the user can freely back up and restore the license information in an ordinary user level when backing up and restoring of the license information are made. To suppress copying, therefore, only those users who have a specific authorization other than security engineer are allowed to edit the license information. To back up the license information, the management module generates a check code from the license information and a unique chassis ID that is allocated to the casing. When restoring of the management module is made, the check code generated from the chassis ID of the management module as the restore object and from the license information in the file backed up is compared with the check code generated inside the file when backup is made. Restore is permitted only when the check codes are found coincident as a result of comparison and in this way, restore to the management module having a different chassis ID is inhibited.

Next, the detail of the present invention will be explained with reference to FIGS. 2 to 6.

Figure 2:
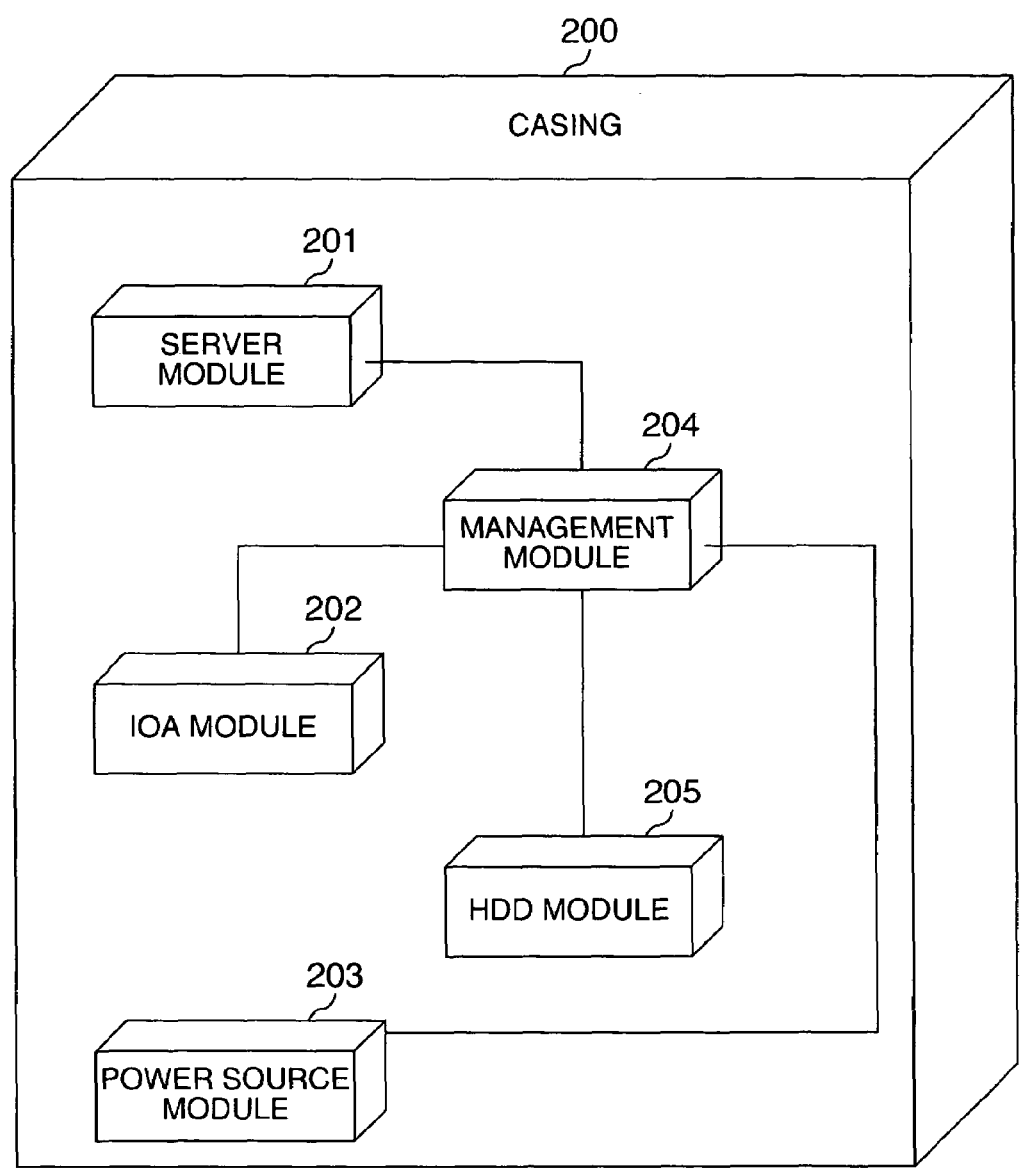
FIG. 2 is an association diagram of various modules constituting a server according to the invention.

FIG. 2 shows an operation environment of the invention. The server function is divided into each module such as a server module 201, an IOA module 202, a power source module 203, a management module 204, an HDD module 205, and so forth, and a plurality of units may be used to constitute each module provided that these modules can be accommodated in a casing 200. Among them, particularly when a plurality of CPU modules is assembled into the SMP construction, higher performance can be exploited than the performance of the single CPU module.

Figure 3:
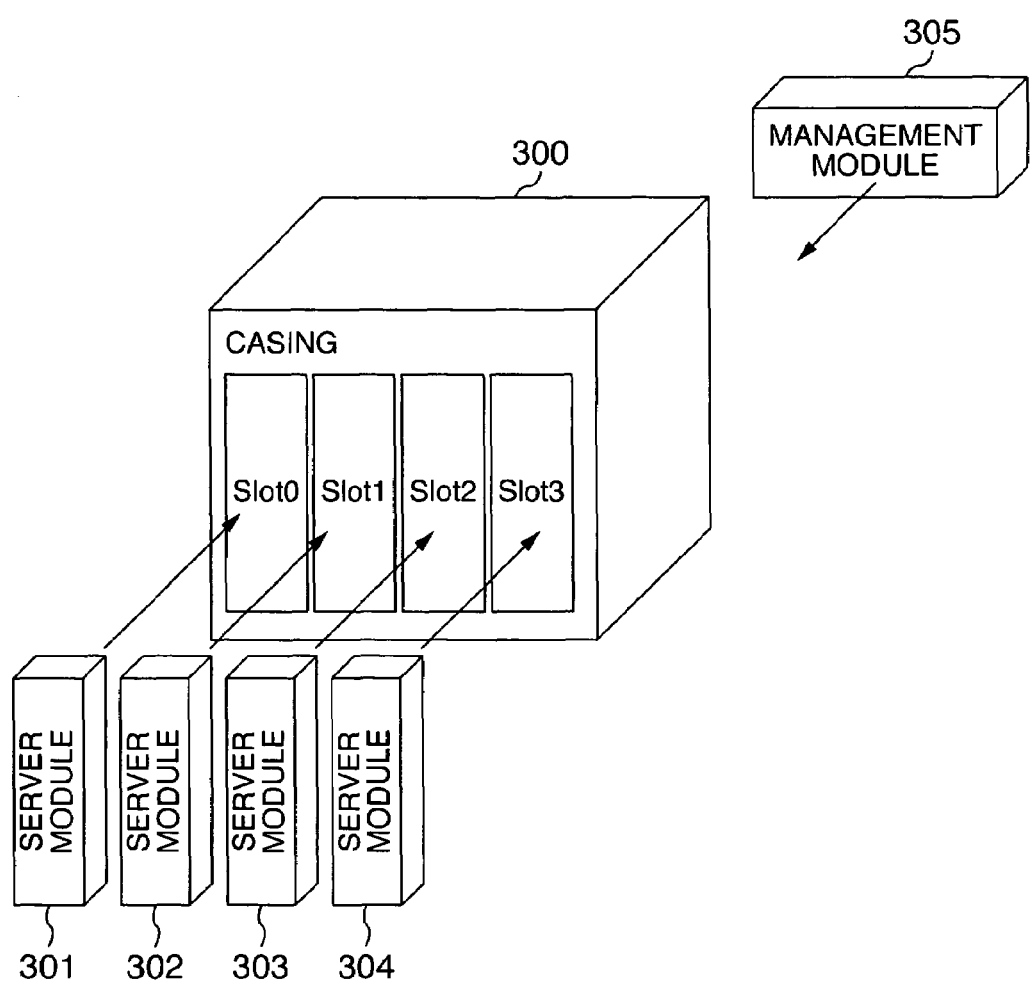
FIG. 3 is an explanatory view for explaining the relation of a plurality of server modules and a way number according to the invention.

FIG. 3 shows a model when a construction of server modules 301 to 304 and a management module 305 is assumed. When two processors are mounted to one server module, only performance as 2-way can be acquired by using one server module 301 but when the server modules 301 and 302 are used as the SMP construction, performance as 4-way can be acquired. Similarly, higher performance can be acquired by combining a plurality of server modules as the SMP servers than the performance of the single CPU module. In the example shown in FIG. 3, the performance can be expanded to the maximum 8-way performance because the four server modules in total are used. The management module 305 can flexibly change the server modules explained above in accordance with the construction required by users.

The license is provided to limit the upper limit of these SMP constructions, and a 1-way model license, a 2-way model license, a 4-way model license and an 8-way model license are defined as the kind of the SMP license. The SMP license represents "right to use SMP partitions each bundling logically a plurality of server modules". One or more partitions can be used per one license. The scale of the SMP that can be utilized is decided in accordance with the kind of the license. In FIG. 3, the management module 305 distinguishes the 4-way model license from the 8-way model license. The license is allocated to the slot position. The license that is once allocated can be expanded or diminished by up-grade, etc.

Figures 4A, 4B:
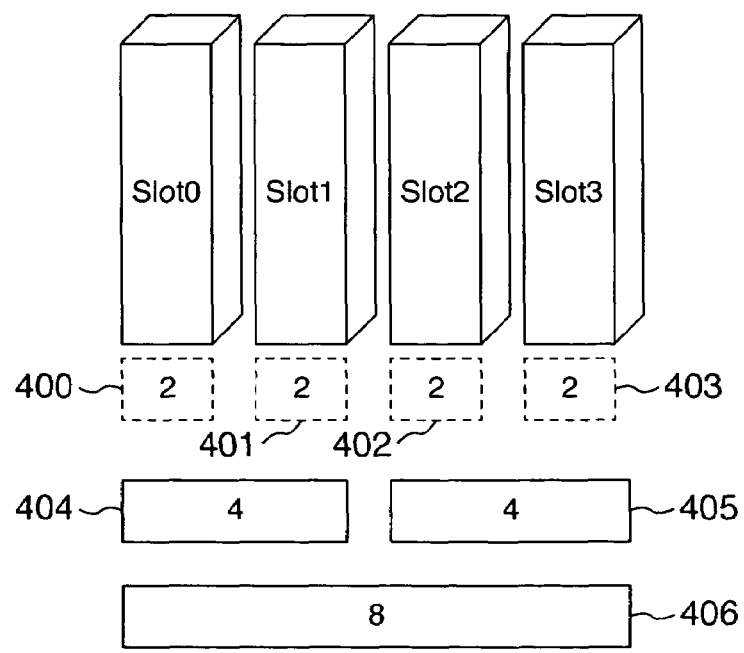
FIGS. 4A and 4B are explanatory views for explaining the SMP construction recognized by each model, respectively.

FIGS. 4A and 4B show the kind of the partitions that can be generated by each model. The row indicated by a mark "X" is selected in each model and when a plurality of partitions are not allocated to the slots in which numerical values are described, the server modules can be mounted. The numerical value described in "Slot Number" in FIG. 4A represents the maximum processor mounting number, and the maximum processor number that can be mounted to one module is 2. The positions at which no numerical values are described are blank slots.

As shown in FIG. 4B, the partitions constituted by one module such as modules 400 to 403 (1-way model license, 2-way model license) are rendered always utilizable because they are not the object of management. When the management module owns the 4-way model licenses of 404 and 405, the SMP construction is constituted by Slot 0 and Slot 1 or Slot 2 and Slot 3 and the server module can be exploited to the maximum 4-way performance. When the management module owns the 8-way model license of 406, the server module can be exploited to the maximum 4-way performance in the same way as described above. When the license information is not exceeded in 404 to 406, the SMP construction can be constituted flexibly. In the 8-way model license, for example, the CPU module having the 2-way performance can be handled as 4 sets or two CPU modules having the 4-way performance can be regarded as existing.

The management module checks the license information at the time of generation of the partition and at the time of making of the power source. Generation of the partition or making of the power source that is not recognized by the license proves to be failure.

Next, backup and restore of the license information will be explained with reference to FIGS. 5A and 5B.

The license information 502 inside the management module is managed as a license kind applied to each slot position.

The check code is a code for confirming that the license information is not forfeited and is calculated by the following formula.

$$\text{CheckCode}=md5(\text{concatenate}(\text{"license information"}, \text{Chassis ID}))  \quad \text{Expression 1}$$

Here, the term "license information" represents a license information portion inside a construction information file, and the term "Chassis ID" represents an ID unique to the apparatus casing that a security engineer inputs. The term "md5" represents a message digest function to be encoded and the term "concatenate" represents a function for concatenating the license information with the Chassis ID.

Figure 5A:
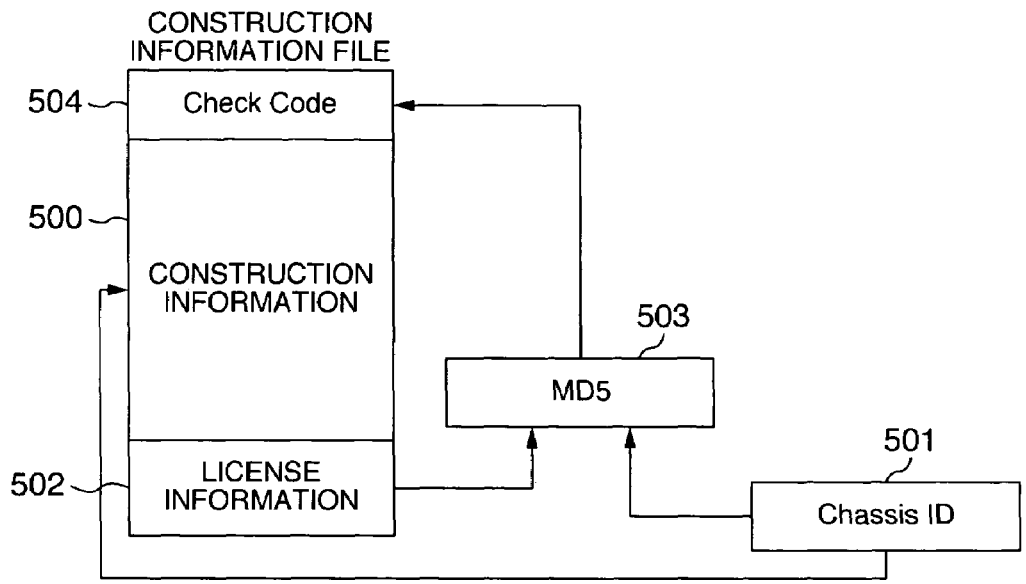
FIGS. 5A and 5B are explanatory views for explaining backup and restore of license information, respectively.
Figure 5B:
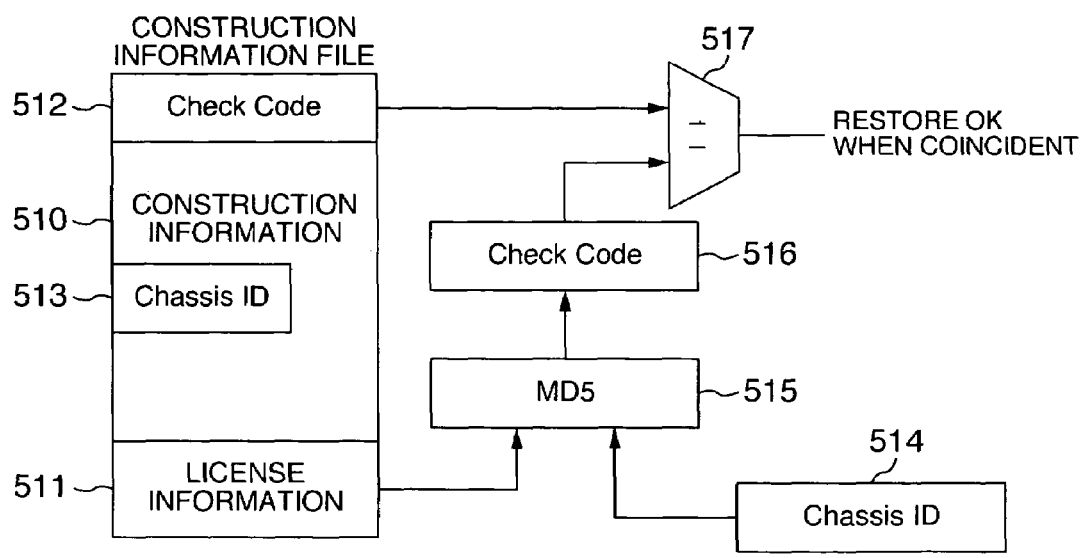

FIG. 5A shows a flowchart at the time of backup and FIG. 5B does a flowchart at the time of making of restore. When the license information is backed up inside the construction information file, the Chassis ID 501 and the license information 502 inputted by the security engineer are encoded (503) by md5 to Check Code 504 and this Check Code 504 is stored inside the construction information file 500. The Chassis ID 501 is stored in the construction information file 500, too.

When the license information 511 inside the construction information file 510 is restored, a CheckCode 516 is generated by using md5 from the Chassis ID 514 inputted by the security engineer and is encoded encoding (515) and this Checkcode 516 is compared with the Checkcode 512 inside the construction information file 510. The Checkcode 512 is generated from the Chassis ID and the license information 511 at the time of backup. The license information is restored when the Checkcode 512 and the Checkcode 516 prove coincident (517). When they are not coincident, restore is stopped by regarding the information as illegal license information because copy is attempted to a management module of a chassis different form the original chassis or the license information is forfeited.

In other words, the license information backed up can be restored to the management module having the same Chassis ID but cannot be made to the management module to which a Chassis ID different from that of backup is set.

Incidentally, it is assumed that persons who can read the license information from the construction information file and restore it are limited only to those who are specifically authorized above the security engineer level.

The construction information file can use a flash memory, an HDD and other storage means.

Next, license check will be explained.

When a server module is added to the partition at the time of generation of the partition and as the SMP construction, whether or not the partition construction satisfies the license condition is checked. This license check is executed before the activation of the partition and making of the power source is inhibited when the license check is not admitted.

Figure 6:
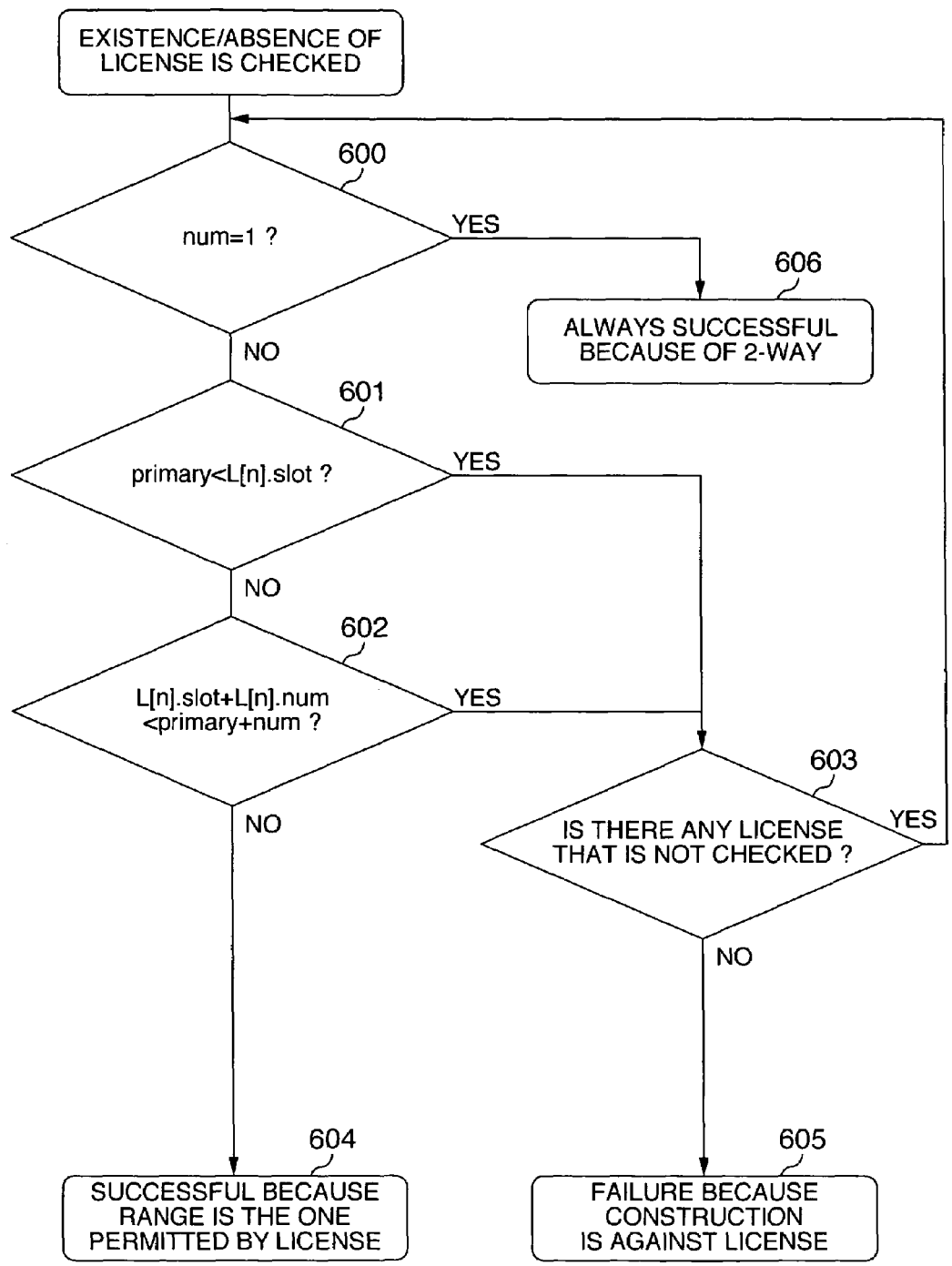
FIG. 6 is a flowchart of a license check.

FIG. 6 shows a flowchart of the license check. All the licenses owned at present are expressed by L[n]. This L[n] is a structure constituted by two members, that is, a slot number (.slot) to which the license is applied and a server module number (.num). A primary slot number of the partition the power source of which is about to be made is expressed by "primary" and the server module number, by "num". Here, both primary and num are stored as the partition information in the construction information file 500. To begin with, whether or not num=1 is checked (600) and when this relation is satisfied (when server module number=1), the construction is always successful irrespective of the existence/absence of the license because of 2-way (making of the power source is permitted) (606). When the construction proves unsuccessful (server module number is greater than 2), all the licenses L[n] owned are checked in the following way.

The next license is checked when primary< L[n].slot (601, 603). The next license is checked when L[n].slot+L[n].num<primary+num (602, 603).

When L[n].slot+L[n].num<primary+num is not satisfied, the construction proves successful because the construction is the one that is permitted by the license (making of the power source is permitted) (604).

The construction fails when the condition is not established for all the licenses (making of the power source is inhibited) (605). Whether or not the SMP construction is effective for the respective slots is judged by conducting this license check.

Incidentally, it is possible to realize inhibition of making of the power source by not allowing a power making sequence of the server module to respond to a power-on request but allowing it to time out when the power making sequence is started with the power-on request signal from the server module as a trigger.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An information processing apparatus comprising:
a plurality of main processing modules; and
a management module that controls an operation of each of said main processing modules as a single server or an operation as a server having an SMP (Symmetric Multi-Processor) construction formed by a combination of two or more of said main processing modules,
wherein said management module has a storage device that stores license information for permitting said main processing modules to be operated as said SMP construction,
wherein when two or more of the main processing modules are intended to be turned on, a first slot number of the main processing module to which the license is applied is compared to a second slot number of the main processing module intended to be turned on, and
wherein when the second slot number is greater than or equal to the first slot number, a first sum of the first slot number of the main processing module to which the license is applied and a first number of the main processing modules to which the license is applied is compared to a second sum of the second slot number of the main processing module intended to be turned on and a second number of the main processing modules intended to be turned on; and
wherein when the first sum is greater than or equal to the second sum, the main processing module intended to be turned on is permitted to be turned on.

2. An information processing apparatus according to claim 1, wherein said management module includes means for operating said partition as a SMP server when the judgment result proves successful.

3. An information processing apparatus according to claim 1, wherein said management module includes means for inhibiting supply of a power source to CPU modules belonging to said partition when the judgment result proves failure.

4. An information processing apparatus according to claim 1, wherein said storage device is a flash memory or a hard disk.

5. An information processing apparatus according to claim 1, further comprising a plurality of slots on which said plurality of server modules are mounted, wherein said license information includes a start slot number representing a mounting position of said server module and a mounting number representing the number of server modules to be mounted, and said management module checks whether or not the mounting positions of all of said server modules belonging to said partition fall within a range represented by said start slot number and the module number of said license information.

6. An information processing apparatus according to claim 1, wherein, when said management module executes backup and restore of said license information, said restore is not executed when a check code generated by said management module for executing backup based on a casing inherent ID and said license information stored in said storage device, is not the same as a check code generated by said management module for executing restore based on the casing inherent ID and said license information stored in said storage device.

7. An information processing apparatus according to claim 6, wherein the casing inherent ID at a time of backup and the casing inherent ID at a time of restore are inputted by a person who is especially authorized.

8. An operation management method of an information processing apparatus including a plurality of main processing modules and a management module that controls an operation of each of said main processing modules as a single server or an operation as a server having an SMP (Symmetric Multi-Processor) construction formed by a combination of two or more of said main processing modules, said management module having a storage device that stores license information for permitting said main processing modules to be operated as said SMP construction, said method, which is performed by said management module, comprising:
when two or more of the main processing modules are intended to be turned on, comparing a first slot number of the main processing module to which the license is applied to a second slot number of the main processing module intended to be turned on; and
when the second slot number is greater than or equal to the first slot number, comparing a first sum of the first slot number of the main processing module to which the license is applied and a first number of the main processing modules to which the license is applied to a second sum of the second slot number of the main processing module intended to be turned on and a second number of the main processing modules intended to be turned on; and when the first sum is greater than or equal to the second sum, permitting the main processing module intended to be turned on to be turned on.

9. An operation management method of an information processing apparatus by an SMP license according to claim 8, wherein said management module causes said partitions to operate as an SMP server when the judgment result admits said construction.

10. An operation management method of an information processing apparatus by an SMP license according to claim 8, further comprising the step of inhibiting supply of a power source to CPU modules belonging to said partition when said construction is not judged as being admitted by said judgment result.

11. An operation management method of an information processing apparatus by an SMP license according to claim 8, wherein said management module further comprises the step of storing said partition information and said license information in storage means of said management module.

12. An operation management method of an information processing apparatus by an SMP license according to claim 8, further comprising the step of storing said partition information and said license information in a flash memory or hard disk of said management module.

13. An operation management method of an information processing apparatus by an SMP license according to claim 8, wherein said information processing apparatus includes a plurality of slots for mounting said plurality of server modules, said license information includes a start slot number representing a mounting start position of said server module and a mounting number representing the number of server modules to be mounted, said partition information includes a primary slot number and a module number of said partition to be constituted, and said management module checks whether or not the mounting positions of all of said server modules belonging to said partition fall within a range indicated by the start slot number and the module number of the license information.

14. An operation management method of an information processing apparatus by an SMP license according to claim 13, further comprising the step of allowing said partition to operate as an SMP server when the mounting positions of all of said server modules belonging to said partition fall within a range indicated by the start slot number and the module number of the license information.

15. An operation management method of an information processing apparatus by an SMP license according to claim 13, further comprising the step of inhibiting supply of a power source to CPU modules belonging to said partition when the mounting positions of all of said server modules belonging to said partition do not fall within a range indicated by the start slot number and the module number of the license information.

* * * * *